(12) United States Patent
Sekula et al.

(10) Patent No.: US 7,309,510 B2
(45) Date of Patent: Dec. 18, 2007

(54) STABLE CHEESE CONDIMENT

(75) Inventors: Bernard Charles Sekula, Glen Gardner, NJ (US); Hector Arturo Iglesias, Buenos Aires (AG)

(73) Assignee: Unilever Bestfoods, North America Division of Conopco, Inc., Englewood Cliffs, NJ (US)

(*) Notice: Subject to any disclaimer, the term of this patent is extended or adjusted under 35 U.S.C. 154(b) by 524 days.

(21) Appl. No.: 10/376,778

(22) Filed: Feb. 28, 2003

(65) Prior Publication Data

US 2004/0170747 A1 Sep. 2, 2004

(51) Int. Cl.
*A23L 1/221* (2006.01)
(52) U.S. Cl. .................. 426/650; 426/580; 426/582; 426/601; 426/613
(58) Field of Classification Search ................ 426/580, 426/582, 585, 601, 602, 603, 650
See application file for complete search history.

(56) References Cited

U.S. PATENT DOCUMENTS

| | | | |
|---|---|---|---|
| 2,882,168 A | 4/1959 | Rossi | |
| 3,836,683 A | 9/1974 | Hoos et al. | |
| 4,568,555 A | 2/1986 | Spanier | |
| 5,028,447 A | 7/1991 | Schenk | |
| 5,320,860 A | 6/1994 | Duval et al. | |
| 5,516,544 A | 5/1996 | Sekula et al. | |
| 5,731,026 A * | 3/1998 | Krumhar et al. | 426/589 |
| 5,945,149 A | 8/1999 | Andreae et al. | |
| 6,013,303 A | 1/2000 | Reddy et al. | |
| 6,153,238 A | 11/2000 | Shannon | |
| 6,227,430 B1 | 5/2001 | Rosen et al. | |
| 6,447,824 B2 | 9/2002 | Watanabe et al. | |
| 6,506,426 B2 | 1/2003 | Adamany et al. | |

FOREIGN PATENT DOCUMENTS

| | | |
|---|---|---|
| EP | 0 832 566 A2 | 4/1998 |
| WO | 00/08951 | 2/2000 |

OTHER PUBLICATIONS

International Search Report on PCT/EP2004/001183 dated Jun. 11, 2004.

* cited by examiner

*Primary Examiner*—Leslie Wong
(74) *Attorney, Agent, or Firm*—Edward A. Squillante, Jr.; Ellen Plotkin

(57) ABSTRACT

A cheese condiment is described. The cheese condiment is ambient stable, and not tart at a pH below 3.75. The cheese condiment contains an oil-in-water emulsion and cheese component that has been added before emulsion formation.

13 Claims, No Drawings

STABLE CHEESE CONDIMENT

FIELD OF THE INVENTION

The present invention is directed to a stable cheese condiment. More particularly, the invention is directed to a squeezable cheese condiment that is stable at ambient temperature, prepared from an emulsion comprising at least one component that is an oil-in-water phase, and not tart, even at a pH below about 3.75.

BACKGROUND OF THE INVENTION

Many conventional cheese products have been marketed for use with food items like sandwiches, hot dogs, crackers, vegetables and macaroni. Such conventional cheese products are typically cold packed or processed, the former usually comminuted and mixed without emulsifying agents and the latter comprising emulsifying agents and cooked to pasteurization temperatures.

The drawbacks associated with such conventional cheese products include the expense of the products, the need for refrigeration, the difficulty in packaging large quantities for food service applications, and the often required need for pasteurization which leads to cheese products with inferior flavor characteristics.

There is increasing interests to develop a good tasting cheese condiment that is stable at ambient temperature. This invention, therefore, is directed to a squeezable cheese condiment that is stable at ambient temperature, prepared from an emulsion comprising at least one component that is an oil-in-water phase, and not tart, even at a pH below about 3.75. The squeezable cheese condiment of this invention is affordable to make, easy to package, unexpectedly stable at ambient temperature and rich in flavor since the condiment does not require pasteurization or other forms of thermal processing.

ADDITIONAL INFORMATION

Efforts have been disclosed for making squeezable condiments. In U.S. Pat. No. 6,013,303, a low-fat squeezable spread with colloidal microcrystalline cellulose is described.

Other efforts have been disclosed for making condiments. In U.S. Pat. No. 6,153,238, a decorator cheese product is described.

Still other efforts have been disclosed for making condiments. In U.S. Pat. No. 6,506,426, a cultured medium and cultured milk is used to make a no fat or low fat cheese.

None of the additional information above describes an ambient stable cheese condiment that is prepared from an emulsion comprising at least one component that is an oil-in-water phase, and not tart, even at a pH below about 3.75.

SUMMARY OF THE INVENTION

In a first aspect, the present invention is directed to a squeezable cheese condiment comprising:
 (a) an emulsion comprising at least one component that is an oil-in-water phase;
 (b) acidulant; and
 (c) cheese component wherein the squeezable cheese condiment is stable at ambient temperature, not tart at a pH below about 3.75, and at least about 50.0% by weight of the cheese flavoring is added to the oil, water, or both oil and water before the emulsion is formed.

In a second aspect, the present invention is directed to a food product combined with the squeezable cheese condiment of the first aspect of this invention.

In a third aspect, the present invention is directed to a method for making the squeezable cheese condiment of the first aspect of this invention.

As used herein, cheese component means flavor directly provided from cheese powder, enzyme modified cheese, melted cheese, shredded cheese, natural cheese flavor or a mixture thereof. Stable means microbiologically stable (i.e., no outgrowth of bacteria, yeast and/or mold) and no flavor loss for at least about five (5) weeks, and preferably, for at least about eight (8) weeks. Stable also means that the oil-in-water phase within the condiment does not separate (i.e., no creaming) for at least ten (10) weeks at ambient temperature. Not tart means no more sour than pasteurized cheese. Emulsifier, as used herein, means a surface active component or component mixture that reduces the interfacial tension between oil and aqueous ingredients. Squeezable is meant to mean dischargeable from an orifice comprising plastic (e.g., polypropylene) bottle that is capable of being compressed by the human hand.

DETAILED DESCRIPTION OF THE PREFERRED EMBODIMENTS

There is no limitation with respect to the type of emulsion that may be used in this invention other than that the emulsion is one which is suitable for human consumption. Preferably, the emulsion used in this invention comprises at least one component that is an oil-in-water phase. Illustrative examples of the oil (e.g., fat) which may be combined with the aqueous phase (i.e., water) in this invention include avocado, coconut, corn, cottonseed, fish, flaxseed, grape, olive, palm, peanut, rapeseed, safflower, sesame, soybean, sunflower oil, mixtures thereof and the like. In a preferred embodiment, the oil used in this invention is liquid at ambient temperature, and most preferably, soybean oil.

The emulsifier that may be used in the emulsion of this invention often has an HLB of greater than about 9.0, and preferably, greater than about 11.0, and most preferably, from about 12.0 to about 18.0, including all ranges subsumed therein. Examples of the emulsifier suitable for use in this invention include PEG 20 tristearate, PEG 20 trioleate, PEG 20 monostearate, PEG 20 monooleate, PEG 20 monopalmitate and PEG 20 monolaurate sorbitan, derivatives thereof, mixtures thereof and the like, all made commercially available by ICI Surfactants under the names Tween or Span.

Other emulsifiers that may be used in this invention include nonionic copolymers of ethylene oxide and propylene oxide made available under the name Pluronic by BASF AG. Even other emulsifiers that may be used in this invention include lecithin and mono- and diglycerides, as well as polyglycerol polyricinoleate (PGPR). The preferred emulsifiers employable in this invention are, however, polysorbate 60, or a phospholipids, and especially, egg yolk derived phospholipids modified with a phospholipase (e.g., lecitase from Novo Nordisk) as disclosed in U.S. Pat. Nos. 5,028,447, 6,277,430, the disclosures of which are incorporated herein by reference. Suppliers of such phospholipids are, for example, M. G. Waldbaum Company and Inova Food Ingredients.

The amount of emulsifier employed in the emulsion of this invention is typically from about 0.05 to about 8.0%, and preferably, from about 0.5% to about 6.0%, and most preferably, from about 1.0 to about 4.0% by weight emulsifier, based on total weight of the condiment and including all ranges subsumed therein. Oil typically makes up from about 5.0% to about 65.0%, and preferably, from about 15.0% to about 55.0%, and most preferably, from about 20.0% to about 40.0% by weight of the condiment, based on total weight of the condiment and including all ranges subsumed therein.

It is noted that in lieu of oil or in combination with oil, conventional fat substitutes may be used. Preferred fat substitutes employable in this invention include fatty acid-esterified alkoxylated glycerin compositions as well as sucrose fatty acid esters. The former and latter are described in U.S. Pat. Nos. 5,516,544 and 6,447,824, respectively, the disclosures of which are incorporated herein by reference. When employed, such conventional fat substitutes preferably make up at least about 30.0%, and most preferably, at least about 75.0% of the total weight of the oil in the emulsion.

The acidulants suitable for use in this invention are limited only to the extent that they may be used in a product suitable for human consumption. Examples of the types of acidulants that may be used in this invention are acetic acid, hydrochloric acid, lactic acid, malic acid, glucono-delta-lactone, phosphoric acid, mixtures thereof, and the like. The acidulant employed in this invention is added in an amount to preferably give the squeezable cheese condiment a pH of less than about 3.75, and preferably, a pH of less than about 3.6, and most preferably, a pH from about 2.75 to about 3.45, including all ranges subsumed therein. Typically, therefore, the amount of acidulant added is from about 0.1 to about 1.0% by weight acid, (i.e., acid in undiluted form) based on total weight of the squeezable cheese condiment. In a preferred embodiment, the acidulant employed in this invention is a mixture of hydrochoric or phosphoric acid, and lactic acid, with lactic acid making up no more than about 40.0% by weight of the total weight of the acidulant mixture. In yet another preferred embodiment, the squeezable cheese condiment is substantially free of vinegar (acetic acid) whereby substantially free means less than about 0.1% by weight based on total weight of the condiment. In a most preferred embodiment, the squeezable cheese condiment of this invention has no vinegar.

Food grade starches (i.e., modified, non-modified, instant or cook-up) may be employed in this invention, and particularly, when the squeezable cheese condiment is less than about 55.0% by weight oil. Such starches (e.g., corn, waxy maize, potato, rice, tapioca, wheat or mixtures thereof) are known thickening agents and often made commercially available from suppliers like National Starch and Chemical Company and E.W. Staley Manufacturing Company. Instant starches are the generally preferred starches used in the squeezable cheese condiment of the present invention, with Ultrasperse® from National Starch and Chemical being especially preferred. The amount of starch used in the squeezable cheese condiment of the present invention is usually from about 1.0 to about 6.0% by weight starch, based on total weight of the condiment, and including all ranges subsumed therein.

The viscosity of the squeezable cheese condiment of the present invention is often from about 60,000 cps to about 300,000 cps, and preferably, from about 75,000 cps to about 225,000 cps, and most preferably, from about 90,000 cps to about 150,000 cps, including all ranges subsumed therein. Viscosity, as used herein means the value obtained with a Brookfield Viscometer with a T-D spindle at RPM setting of 5 for 30-60 seconds, and at about ambient temperature.

Sweeteners may be used in this invention and they include, for example, syrups, sucrose, glucose, saccharin, aspartame, dextrose, lactose, levelose, maltose, fructose, mixtures thereof and the like. When employed, such sweeteners typically make up less than about 25.0% by weight of the total weight of the squeezable cheese condiment.

Protein may be employed in this invention. Sources of protein preferred for use are whey, soy, caseinate or a mixture thereof. The amount of protein used in the squeezable cheese condiment is limited only to the extent that the amount added does not interfere with the desired flavor of the condiment. Typically, the amount of protein used is less than about 5.0% by weight of the condiment.

Preferred optional additives which may be employed in the squeezable cheese condiment of the present invention include salt (and other spices and seasonings), vitamins, artificial flavors and colors, fruit puree, gums, preservatives, antioxidants, chelators, meat like ham and bacon bits or particulates, buffering agents, vegetable bits or particulates, fruit bits or particulates, mixtures thereof and the like. Such optional additives, when used, collectively, do not make up more than about 20.0% by weight of the total weight of the cheese condiment. Water makes up the balance of the squeezable cheese condiment.

Illustrative examples of the preferred gums suitable for use in this invention include cellulose, locust bean, xanthan, carrageenan, guar gum, mixtures thereof and the like. The preferred preservatives suitable for use in this invention include sodium benzoate, potassium benzoate, potassium sorbate, sorbic acid, benzoic acid, mixtures thereof and the like.

Anti-oxidants suitable for use in this invention include a tocopherol, ascorbic acid, ascorbyl palmitate, tertiary-butyl hydroquinone, mixtures thereof and the like. Chelators suitable for use in this invention include EDTA and its salts, citric acid, sodium tripolyphosphate, sodium carbonate, potassium carbonate, mixtures thereof and the like.

The fruit and vegetable bits that may be used in this invention are typically small enough to fit through the orifice present in a conventional squeeze bottle. The vegetable bits often include peppers, carrots, cabbage, onion, broccoli, mixtures thereof and the like. The fruit bits often include pears, apples, grapes, tomatoes, mixtures thereof and the like.

When making the squeezable cheese condiment of the present invention, usually about 80.0 to about 90.0% by weight of the total water used in the squeezable cheese condiment is combined with starch to make a starch and water composition. The composition is mixed to make a starch slurry to which optional additives may be added. Such a starch slurry may then be combined with emulsifier, cheese flavoring and oil and mixed to form a homogeneous cheese condiment. In a preferred embodiment, acidulant is added last often being diluted with water. In a most preferred embodiment, cheese flavoring is first mixed with the starch slurry before emulsion is prepared or made. The cheese flavoring, if desired, may first be mixed with from about 10.0% to about 20.0% by weight of the total water used in the condiment to produce a cheese mix which can then be added to the starch slurry, oil or both. Regardless of how the cheese flavoring is added, it is, again, most preferred in this invention to dissolve and suspend (at least 50.0%, and preferably at least about 75.0%, and most preferably, all) the cheese flavoring in the water, oil or both before emulsion is made. When making the emulsion, the ingredients (i.e., water, oil and cheese flavoring) should be thoroughly mixed so that a smooth and homogeneous condiment is obtained.

The amount of cheese component employed in the squeezable cheese condiment is typically from about 3.0% to about 25.0%, and most preferably, from about 5.0% to about 15.0% by weight of the condiment (based on total weight of the condiment), if the cheese component is flavor directly provided from cheese that is melted or shredded. If the cheese component is directly provided from cheese powder, the amount of cheese powder employed is typically from about 2.0% to about 10.0%, and preferably, from about 2.5% to about 8.0% by weight of the condiment (based on total weight of the condiment). If, on the otherhand, the cheese component is natural cheese flavoring, the cheese component typically makes up from about 0.5 to about 5.0%, and preferably, from about 1.0 to about 3.5% by weight of the total weight of condiment.

There is no limit with respect to the type of food product that may be used with the squeezable cheese condiment of this invention. Typically, however, the squeezable cheese condiment is used with vegetables, like potatoes and broccoli, and wheat comprising products, like crackers, pizza, breads, rolls, bagels, chips, pretzels and especially, macaroni. Such a squeezable cheese condiment may also be used with meat products like, hot dogs, and especially, steak. Therefore, it is in the cope of this invention to use the condiment of this invention in hot applications whereby the condiment of this invention can be heated from about 60° C. to about 70° C. without breaking the emulsion.

The packaging for the squeezable cheese condiment of this invention is often a glass jar, food grade sachet or squeezable plastic bottle. Sachets are preferred for food service applications, and a squeezable plastic bottle is preferred for domestic use.

The examples which follow are provided to facilitate an understanding of the present invention. The examples are not intended to limit the scope of the claims.

EXAMPLES

Stable cheese condiments (with a pH of about 3.2) were made by first mixing water and instant starch to make a starch slurry and then mixing the same with oil. An emulsifier and cheese component mixture was also made and added to the starch slurry before any oil was added to the starch slurry. Mixing was achieved under moderate sheer in a conventional mixer and at atmospheric pressure and ambient temperature. All other additives were added during mixing.

| Ingredient | % by Weight |
|---|---|
| Water | 39.0-42.0 |
| Soybean Oil | 39.0-42.0 |
| Instant Starch | 4.0-4.5 |
| Sucrose | 2.8-3.2 |
| Emulsifier (enzyme modified egg) | 2.8-3.2 |
| Salt | 1.2-1.4 |
| Phosphoric acid (91.5% water) | 2.8-3.2 |
| Sorbic acid | 0.08-0.11 |
| Xanthan gum | 0.08-0.11 |
| CaNa$_2$ EDTA | 0.007-0.008 |
| Enzyme modified cheese flavoring | 1.8-2.4 |
| Natural cheese flavor | 0.7-0.8 |
| Whey protein concentrate | 0.7-0.8 |
| Food coloring | 0.10-0.13 |
| Lactic acid (50% water) | 0.15-0.25 |

| Ingredient | % by Weight |
|---|---|
| Water | 29.0-34.0 |
| Soybean Oil | 29-32 |
| Cheddar Cheese | 2.0-4.0 |
| Cheeztang, uncolored | 1.4-1.8 |
| Enzyme modified egg yolk | 2.4-2.8 |
| Starch, Ultrasperse M | 1.8-2.2 |
| Phosphoric Acid, 85% | 0.5-0.7 |
| Lactic Acid, 50% | 0.15-0.25 |
| Salt, granular | 1.8-2.0 |
| Corn syrup | 18.0-21.0 |
| Xanthan gum | 0.25-0.4 |
| Sorbic acid | 0.08-0.13 |
| FD&C Yellow #5: diluted | 0.045-0.055 |
| FD&C Yellow #6: diluted | 0.045-0.055 |
| CaNa$_2$ EDTA | 0.007-0.009 |
| Dehydrated sweet whey | 3.8-4.2 |

| Ingredient | % by Weight |
|---|---|
| Water | 37.0-42.0 |
| Soybean Oil | 35.0-39.0 |
| Cheddar Cheese | 9.0-11.0 |
| Enzyme modified egg yolk | 2.4-2.8 |
| Starch, Ultrasperse M | 4.2-4.6 |
| Phosphoric Acid, 85% | 0.5-0.7 |
| Salt, granular | 1.0-1.4 |
| Sucrose, fine, granulated | 2.8-3.2 |
| Xanthan gum | 0.08-0.12 |
| Sorbic acid | 0.08-0.12 |
| CaNa$_2$ EDTA | 0.007-0.009 |
| Whey protein concentrate | 0.6-0.8 |

| Ingredient | % by Weight |
|---|---|
| Water | 29.0-33.0 |
| Soybean Oil | 27.0-29.0 |
| Cheddar Cheese | 9.0-11.0 |
| Enzyme modified egg yolk | 2.5-2.7 |
| Starch, Ultrasperse M | 1.8-2.2 |
| Hydrochloric acid | 0.45-0.65 |
| Lactic Acid, 50% | 0.18-0.22 |
| Salt, granular | 1.7-1.9 |
| Corn syrup | 18.0-22.0 |
| Xanthan gum | 0.23-0.27 |
| Sorbic acid | 0.08-0.13 |
| CaNa$_2$ EDTA | 0.007-0.009 |
| Dehydrated sweet whey | 2.8-3.0 |

Each of the resulting squeezable cheese condiments made were placed in about ten (10) sealed fourteen (14) oz. polypropylene bottles and stored at ambient temperature. After about eight (8) weeks, no outgrowth of bacteria, yeast and/or mold was observed, and no creaming was observed.

Also, approximately ten (10) panelists sampled the squeezable cheese condiments made and concluded that the condiments retained all flavor and were not tart, even after being placed at ambient temperature for about ten (10) weeks.

The results obtained above indicate that the squeezable cheese condiment of the present invention is unexpectedly stable and good tasting when kept at ambient temperature, even for an extended period of time. The results also show that a stable cheese condiment may be obtained by first adding cheese component before making an emulsion.

What is claimed is:

1. A squeezable cheese condiment comprising:
    (a) an emulsion comprising at least one component that is an oil-in-water phase;
    wherein oil makes up from about 5.0 to about 65.0% by weight of the condiment;
    (b) acidulant; wherein the acidulant is a mixture of hydrochloric acid or phosphoric acid, and lactic acid wherein the mixture is substantially free of acetic acid and comprises no more than about 40.0% by weight of lactic acid; and
    (c) cheese component;
    having an amount of protein of less than about 5.0% by weight of the condiment;
    wherein the squeezable cheese condiment is stable at ambient temperature without requiring thermal processing, has a pH of about 2.75 to less than about 3.75; and
    the emulsion is one where at least about 50.0% by weight of the cheese flavoring is added to the oil, water, or both and water before the emulsion is formed;
    wherein said squeezable cheese condiment is non-tart.

2. The squeezable cheese condiment according to claim 1 wherein the oil is avocado, coconut, corn, cottonseed, fish, flaxseed, grape, olive, palm, peanut, rapeseed, safflower, sesame, soybean, sunflower oil, or a mixture thereof.

3. The squeezable cheese condiment according to claim 1 wherein emulsion comprises an emulsifier with an HLB of greater than about 11.0.

4. The squeezable cheese condiment according to claim 1 wherein the emulsion comprises an emulsifier selected from the group consisting of polysorbate 60 and an egg yolk derived phospholipid.

5. The squeezable cheese condiment according to claim 1 wherein the emulsion comprises a fat substitute in addition to oil or a fat substitute in lieu of oil.

6. The squeezable cheese condiment according to claim 1 wherein the squeezable cheese condiment has a pH from about 2.75 to about 3.45.

7. The squeezable cheese condiment according to claim 1 wherein the squeezable cheese condiment further comprises a modified, non-modified, instant or cook-up starch, or a mixture thereof.

8. The squeezable cheese condiment according to claim 1 wherein the squeezable cheese condiment has a viscosity from about 60,000 cps to about 300,000 cps.

9. The squeezable cheese condiment according to claim 1 wherein the squeezable cheese condiment further comprises particulates of meat, vegetables, fruit or a combination thereof.

10. The squeezable cheese condiment according to claim 1 wherein the cheese component is natural cheese flavor cheese powder, enzyme modified cheese melted cheese, shredded cheese, natural cheese flavor or a mixture thereof.

11. A food product in combination with a squeezable cheese condiment where the squeezable cheese condiment comprises:
    (a) an emulsion comprising at least one component that is an oil-in-water phase; wherein oil makes up from about 5.0 to about 65.0% by weight of the condiment;
    (b) acidulant; wherein the acidulant is a mixture of hydrochloric acid or phosphoric acid, and lactic acid wherein the mixture is substantially free of acetic acid and comprises no more than about 40.0% by weight of lactic acid; and
    (c) cheese component;
    having an amount of protein of less than about 5.0% by weight of the condiment;
    wherein the squeezable cheese condiment is stable at ambient temperature without requiring thermal processing, has a pH of about 2.75 to less than about 3.75; and
    the emulsion is one where at least about 50.0% by weight of the cheese flavoring is added to the oil, water, or both oil and water before the emulsion is formed;
    wherein said squeezable cheese condiment is non-tart.

12. The food product in combination with a squeezable cheese condiment according to claim 11 wherein the food product is a vegetable, meat, or fruit.

13. The food product according to claim 11 wherein the squeezable cheese condiment can be heated to about 60° C. to about 70° C. without breaking emulsion.

* * * * *

UNITED STATES PATENT AND TRADEMARK OFFICE
CERTIFICATE OF CORRECTION

PATENT NO. : 7,309,510 B2 Page 1 of 1
APPLICATION NO. : 10/376778
DATED : December 18, 2007
INVENTOR(S) : Sekula et al.

It is certified that error appears in the above-identified patent and that said Letters Patent is hereby corrected as shown below:

Title Page; on page 1, (75), please change "Inventors: Bernard Charles Sekula, Glenn Gardner, NJ (US); Hector Arturo Iglesias, Buenos Aires (AG)" to:

--Inventors: Bernard Charles Sekula, Glenn Gardner, NJ (US); Hector Arturo Iglesias, Buenos Aires (AG); and Moez Mohamed Bouraoui, Clifton, NJ (US)--

Signed and Sealed this

Twenty-ninth Day of April, 2008

JON W. DUDAS
*Director of the United States Patent and Trademark Office*